(12) United States Patent
Raza et al.

(10) Patent No.: US 9,990,411 B2
(45) Date of Patent: Jun. 5, 2018

(54) PLATFORM FOR VISUALLY CONFIGURING A PROCESS FLOW ACROSS MULTIPLE DISCRETE PROCESSES

(71) Applicant: SuccessFactors, Inc., South San Francisco, CA (US)

(72) Inventors: Abbas Raza, Dublin, CA (US); Abhijit Salvi, Cupertino, CA (US); Dan Diodati, Dublin, CA (US); Sergei Ponomarev, San Mateo, CA (US); Ankur Bhatt, San Francisco, CA (US); Eric Yip, Palo Alto, CA (US)

(73) Assignee: SuccessFactors, Inc., South San Francisco, CA (US)

( * ) Notice: Subject to any disclaimer, the term of this patent is extended or adjusted under 35 U.S.C. 154(b) by 349 days.

(21) Appl. No.: 14/958,768

(22) Filed: Dec. 3, 2015

(65) Prior Publication Data

US 2017/0161347 A1    Jun. 8, 2017

(51) Int. Cl.
*G06F 15/16* (2006.01)
*G06F 17/30* (2006.01)
*H04L 29/06* (2006.01)

(52) U.S. Cl.
CPC .. *G06F 17/30572* (2013.01); *G06F 17/30864* (2013.01); *H04L 67/42* (2013.01)

(58) Field of Classification Search
CPC ......... G06F 17/30572; G06F 17/30866; H04L 67/42
USPC ........................................ 709/203, 220, 221
See application file for complete search history.

(56) References Cited

U.S. PATENT DOCUMENTS

| 2004/0039603 | A1* | 2/2004 | Hanrahan | G06Q 10/10 705/2 |
| 2004/0083479 | A1* | 4/2004 | Bondarenko | G06F 9/546 719/310 |
| 2005/0198639 | A1* | 9/2005 | Matsui | G06Q 10/06 718/100 |
| 2008/0120081 | A1* | 5/2008 | Chandrashekar | H04L 41/0896 703/13 |
| 2010/0131418 | A1* | 5/2010 | McCagg | G06Q 10/00 705/321 |

* cited by examiner

*Primary Examiner* — Frantz Jean
(74) *Attorney, Agent, or Firm* — Fountainhead Law Group P.C.

(57) ABSTRACT

Embodiments described herein relate to an improved system and method for defining and reconfiguring process flows for one or more processes within an organization visually in a graphical display at a client system using a process flow diagram comprising activity elements and decision elements representing the activities and decisions to be performed during execution of a process flow. Modifications to the process flow diagram at the client display can be saved and used to update the process flow. The process flow definitions and/or reconfigurations can be supplied to a server for storage in a database, and can be later accessed during execution of the process flow. During execution of the sequence of activities of a particular process flow, the server can access one or more services from a plurality of different service modules in communication with the server to provide those services.

20 Claims, 9 Drawing Sheets

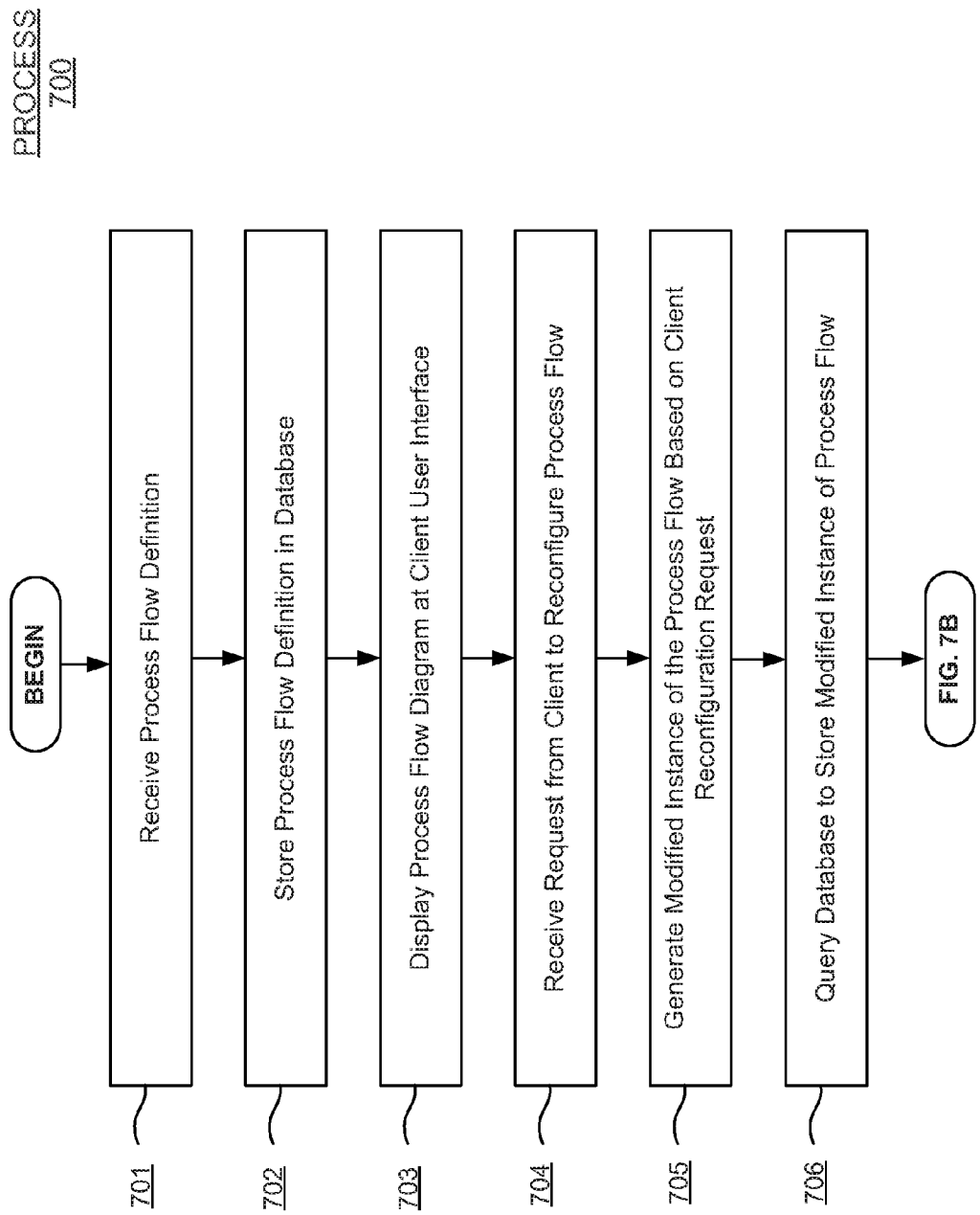

PLATFORM FOR VISUALLY CONFIGURING A PROCESS FLOW ACROSS MULTIPLE DISCRETE PROCESSES

TECHNICAL FIELD

At least certain embodiments disclosed herein relate generally to data processing in a computer network, and more particularly to a system and method for visually defining and configuring a process flow involving integrating multiple discrete processes.

BACKGROUND

Processes within an organization can be complex and incur a significant amount of resources and manpower to perform. For example, a recruiting process might involve creating a requisition, getting an approval, advertising the position on an external portal such as indeed.com, monster.com, sourcing potential candidates, performing interviews, selecting a candidate, sending out offers, receiving acceptances, etc. The candidates must be sourced and a filtering process applied to select the best candidate. After a candidate is selected, a process of onboarding the candidate as a new employee will typically be performed. Once an employee is onboard, there may be other various other administrative and management processes that are needed during the life cycle of the employee while he or she is working for the organization such as, for example, performance reviews, promotions, retirement, termination, and pension plans, etc.

Such process flows may be complex and involve a number of different activities and decisions that need to be made by multiple different individuals having different roles within an organization. In addition, these processes may also vary significantly from department to department, organization to organization, industry to industry, and/or country to country, etc. The retail industry, for example, may have a different hiring process based on the season, whereas the software industry may have a completely different process for sourcing and filtering candidates.

Conventionally, the way these processes are implemented in a computer system is through manually coding program code for each activity in the process. The various tasks associated with processes can be modified or updated manually by going into the code and finding the particular process and the particular configuration of that process to make any changes. This approach limits the process significantly and may require a significant effort making revisions as the process changes over time within an organization. In addition, what may work for one organization most likely will not work for another because they each have their own set of processes and need a mechanism to customize those processes according to their particular needs.

In the case of a new hire, for example, a web page may be programmatically coded to capture a requisition form and then the web page may make one or more service calls to various service modules involved in executing the process. Every time the process changes within the organization, however, individuals must manually go through and re-code the process, including revising any integration between any discrete processes involved. A number of different modules need to be integrated for every process, and then re-coded every time the process is changed. This can be a monumental task depending on the complexity of the processes involved.

As a result, there needs to be some mechanism by which the discrete processes involved in an organization can be controlled and managed by the organization.

SUMMARY

The embodiments described herein include improved systems, methods and computer-readable media for visually defining and configuring process flows involving multiple discrete processes. In one embodiment a method is disclosed comprising receiving a definition of a process flow comprising a sequence of activities for one or more discrete processes, where each activity in the sequence of activities of the process flow is configured to access one or more services from a plurality of different service modules in communication with the server to execute the sequence of activities of the process flow.

The method further comprises storing the process flow in a database, providing, to a graphical display at a client system, a display of a process flow diagram comprising a sequence of elements visually representing the sequence of activities of the process flow, receiving, at the server, a request from the client system to reconfigure the process flow, where the request to reconfigure the process flow is generated based on visually reconfiguring one or more elements in the process flow diagram at the client system, reconfiguring the process flow in response to the request from the client system to generate a modified instance of the process flow, and querying the database to store the modified instance of the process flow.

In one embodiment, the method further comprises receiving a start event indication from the client system to execute the modified instance of the process flow, performing a first service call to a first service module associated with a first element in the sequence of elements in the process flow diagram, receiving a first service from the first service module in response to the first service call, performing a second service call to a second service module associated with a second element in the sequence of elements in the process flow diagram, receiving a second service from the second service module in response to the second service call, and providing the first service and the second service to the client system.

The sequence of elements in the process flow diagram may include activity elements and decision elements. The elements in the process flow diagram may be reconfigured at the client system based on repositioning elements from one location to another location in the display of the process flow diagram, based on adding new elements to the display of the process flow diagram or deleting elements from the display of the process flow diagram, or based on modifying an attribute associated with an element in the process flow diagram.

In one embodiment, the method may further comprise evaluating, at a rules engine, one or more conditions associated with the decision elements in the process flow diagram based on one or more attributes associated with each condition, invoking a state engine in communication with the server during execution of the modified instance of the process flow to manage the state of the modified instance of the process flow, and displaying, in the graphical display at the client system, a current state of progression of the execution of the modified instance of the process flow at a point in time.

In another embodiment a system is disclosed comprising a processor, a database system in communication with the processor via a communications medium, and a system memory configured to store computer code, which when executed by the processor, causes the processor to perform operations comprising receiving a definition of a process flow comprising a sequence of activities for one or more discrete processes, where each activity in the sequence of activities of the process flow is configured to access one or more services from a plurality of different service modules in communication with the server to execute the sequence of activities of the process flow, storing the process flow in the database system, providing, to a graphical display at a client system, a display of a process flow diagram comprising a sequence of elements visually representing the sequence of activities of the process flow, receiving a request from the client system to reconfigure the process flow, where the request to reconfigure the process flow is generated based on visually reconfiguring one or more elements in the process flow diagram at the client system, reconfiguring the process flow in response to the request from the client system to generate a modified instance of the process flow, and querying the database to store the modified instance of the process flow.

In yet other embodiments, a computer readable storage medium is disclosed that tangibly embodies programmed computer code, which when executed by a computer system, causes the computer system to perform operations comprising receiving a definition of a process flow comprising a sequence of activities for one or more discrete processes, where each activity in the sequence of activities of the process flow is configured to access one or more services from a plurality of different service modules in communication with the server to execute the sequence of activities of the process flow, storing the process flow in a database, providing, to a graphical display at a client system, a display of a process flow diagram comprising a sequence of elements visually representing the sequence of activities of the process flow, receiving a request from the client system to reconfigure the process flow, where the request to reconfigure the process flow is generated based on visually reconfiguring one or more elements in the process flow diagram at the client system, reconfiguring the process flow in response to the request from the client system to generate a modified instance of the process flow, and querying the database to store the modified instance of the process flow.

The following detailed description and accompanying drawings provide a better understanding of the nature and advantages of the present disclosure.

BRIEF DESCRIPTION OF THE DRAWINGS

For a better understanding of at least certain embodiments, reference will be made to the following detailed description, which is to be read in conjunction with the accompanying drawings.

FIGS. 7A-7B depict flow charts of an example embodiment of a process for visually configuring a process flow according to the techniques described herein.

DETAILED DESCRIPTION

Figure 1:
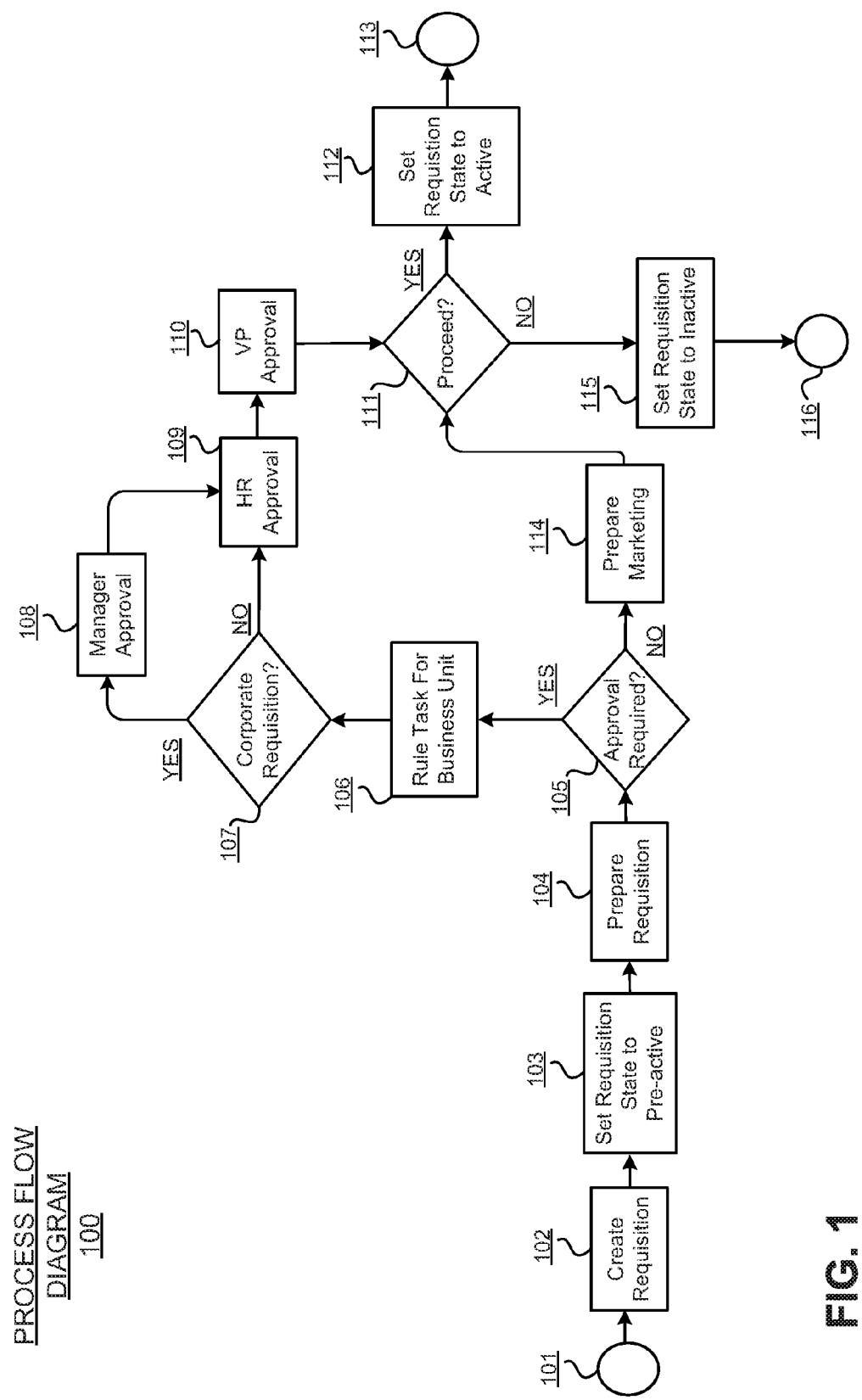
FIGS. 1-2 depict example process flow diagram embodiments configured according to the techniques described herein.

Throughout this description, for the purposes of explanation, numerous example details are set forth in order to provide a thorough understanding of the present disclosure. It will be apparent to one skilled in the art, however, that the techniques described herein may be practiced without some of these specific details. In other instances, well-known structures and devices may be shown in block diagram form to avoid obscuring the underlying principles of the techniques described herein.

The novel embodiments and techniques described herein relate to an improved system and method for configuring process flows for multiple discrete processes within an organization. One advantage of these disclosed techniques is the ability to define and manage business processes visually in the graphical display at a client system while the processing of the process flow is performed by servers on the backend of the system. Embodiments are adapted to integrate and visually define, configure, and/or reconfigure these processes, such as, for example, processes for recruiting, onboarding, promotion, retirement, termination, etc. The novel techniques of this disclosure provide can provide a set of standardized process definitions, which can be customized by a particular client organization depending on the client's particular needs. This cannot be done easily through computer code—it has to be much more programmable and configurable. The embodiments provide process flow diagram to clients that enables them to visually configure a set of activities/tasks involved in a process flow using a process flow diagram in a graphical display at the client system.

Each process has a corresponding process flow that includes a series of operations to accomplish a particular task. The processes of an organization may vary from department to department, country to country, etc., and may depend on local laws of a particular jurisdiction. Process activity blocks and decision points may be visually configured in the process flow diagram at the client computer display. The aspects of the described embodiments can be based on any configurable attribute such as, for example, based on the department, organization, region, country, etc.

The novel systems and methods may enable defining and configuring such processes within an organization in a dynamic manner. Clients can visually see a process depicted in the process flow diagram, and can define new processes or reconfigure existing process according to their particular needs in the visual display itself. In some cases, additional operations and activities can be added, and in other cases, operations may be deleted or modified as described in more detail below.

In a promotion event, for example, a business process engine ("BPE") configured according to the embodiments described herein can be utilized to assist in preparing the employee for the new role. The BPE can execute a promotion event process flow, which can automatically trigger activities that need to be accomplished before and after the event happens. For instance, prior to the effective date of the promotion, certain individuals may need to be notified that they are getting a new manager. The BPE can also provide notifications and learning materials to the individual employee being promoted. The employee can be presented with a list of their new team members, team member profiles, skillsets, performance ratings, etc. A notification can be provided to the employee with a link to materials that may be necessary to assist an employee in their new role.

In another example, if an employee is relocated to a new work location, the BPE can define and configure processes such as assisting with movers, identifying places to stay, and identifying schools for the employee's children, places to eat, and other activities, etc. In addition, the employee may additionally be provided with learning materials related to the local language and customs of the new work location and area, etc.

The activities can be configured through the BPE. The BPE may also integrate across multiple different service modules involved in a particular process flow. Activities can be generated, such as creating a requisition for example, In such a case, the activities can include information that needs to be placed into the requisition form, what fields show up in the form, how and where the requisition form gets saved, etc. Behind the scenes, the BPE can make the requisite service calls to the appropriate service modules to provide the necessary services and information, for example, through internal service application programming interfaces ("APIs") or external service calls.

Accordingly, the embodiments described herein are adapted to enable visual definition and configuration of an entire set of processes within an organization. The BPE may be adapted to navigate and orchestrate the various different activities and services for these processes. FIG. 1 depicts an example process flow diagram embodiment configured according to the techniques described herein. In the illustrated embodiment, process flow diagram 100 depicts a graphical display of an example requisition process flow for recruiting a new candidate for an organization. Clients can customize the process displayed in the process flow diagram 100 in a graphical display at the client's system. The process can include, for example, creating the requisition, publishing it externally or internally, sourcing candidates, interviewing, making an offer, performing a background check, performing a security check, starting the onboarding process, etc.

It is noted that the process flow depicted in process flow diagram 100 may be coded in Business Process Model and Notation ("BPMN"), which is the industry standard graphical representation used for specifying business process in a business model. BPMN may be utilized for defining activity blocks, access points, decision points, conditions, start events, end events, etc. At the backend, the BPMN is stored as a markup language configuration. The embodiments of the BPE described herein is adapted to be compliant with BPMN. More information about BMPN can be obtained from the industry website BPMN.org.

The process flow depicted in process flow diagram 100 includes a number of activity blocks and decision points. In the illustrated embodiment, execution of the process depicted in process flow diagram 100 begins at access point 101. Access point 101 represents an event for initializing execution of the process 100. Access points 101, 113 and 116 in the process flow diagram 100 show where the process 100 begins and ends. In one embodiment, the access points 101, 113 and 116 may connect to further discrete processes, which may be standardized processes or customized ones.

The process flow depicted in process flow diagram 100 continues at activity block 102 where the requisition is created. The state of the requisition can then be set to the pre-active at activity block 103. The requisition is then prepared at activity block 104. As shown, the process depicted in process flow diagram 100 requires a number of decisions to be made, which are represented by the decision point elements 105, 107, and 111. These decision points may define the conditions that need to be met and the outcomes of those conditions. Any attributes to be associated with the conditions can be defined and configured according to the specific needs of the organization. As will be discussed in more detail below, conditions can be supplied through a rules engine integrated with the BPE.

Any activities related to the process or an individual employee can be configured. Based on a selected condition, the BPE knows which activities are next in the process flow. These conditions are also user configurable. A user may determine that a particular location attribute and a particular department attribute may be important conditions to evaluate in a particular process flow.

The first decision point 105 in the process sequence depicted in FIG. 1 is adapted to determine whether approval is required for the requisition. If so, the process flow continues at activity block 106 where a rule task is set up for the business unit. Decision point 107 is then encountered, which is used to make a determination as to whether the requisition is a corporate requisition. If so, the process flow requires manager approval at activity block 108. If the subject requisition is not a corporate requisition, the process flow continues at activity block 109 to obtain HR approval.

In the illustrated embodiment, HR approval is then provided at activity block 109 and then vice president ("VP") approval is provided at activity block 110. The process flow of process flow diagram 100 continues at decision point 111 where it a determination is made as to whether to proceed with the requisition. If so, the process flow continues to activity block 112 where the requisition state can be set to active. Access point 113 is then encountered in the process flow, which as discussed above, represents the end of the process depicted in process flow diagram 100.

If, on the other hand, approval is not required at decision point 105, marketing can proceed for the requisition. Control then flows to decision point 111 as discussed above. Further, if the decision is not made to proceed at decision point 111, the process flow continues at activity block 115 where the requisition state can be set to inactive. Access point 116 is then encountered, which represents the end of the process flow depicted in process flow diagram 100.

The initial configuration or definition of the process flow as depicted in the process flow diagram may be a default model based on standard process flows within a particular process and industry. These standard process flows can be coded in BPMN. This completes the process illustrated in process flow diagram 100 according to one example embodiment.

Figure 2:
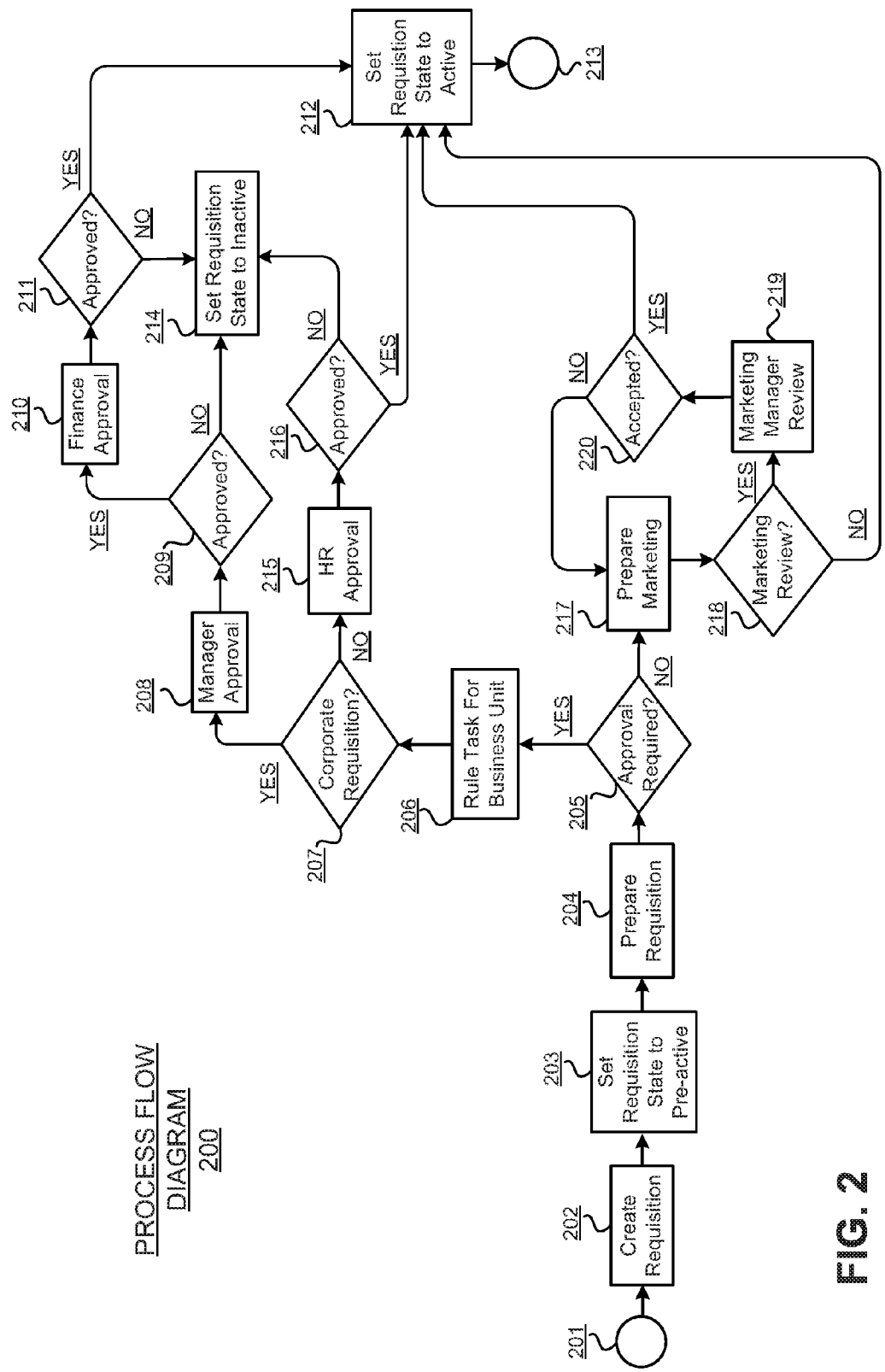

FIG. 2 depicts an example process flow diagram embodiment configured according to the techniques described herein. Process flow diagram 200 includes a process that is slightly modified from the one depicted in FIG. 1. As discussed, the embodiments described herein are adapted to enable client users to visually define and configure (or reconfigure) various process flows according to the needs of their organization. In the illustrated embodiment of process flow diagram 200, the first activity blocks 201 through 208 correspond to the activities 101 through 108 discussed before in FIG. 1 and will not be discussed here for the sake of brevity.

At decision point 209 a determination is made as to whether manager approval has been received at activity block 208. If so, the process flow continues to activity block 210 where finance approval is to be obtained. If manager approval is not obtained, the process flow continues to activity block 214 where the requisition state can be set to inactive. At decision point 211 a further determination is made as to whether finance approval has been received. If so, the process flow continues to activity block 212 where the requisition state can be set to active. The process flow can then continue to the access point 213 representing the end of the process flow depicted in process flow diagram 200. If finance approval is not obtained, the process flow continues to activity block 214 where the requisition state is set to inactive.

According to the illustrated embodiment, if it is determined that the requisition is not a corporate requisition at decision point 207, the process flow continues to activity block 215 were human resources ("HR") approval is to be obtained. At decision point 216 a further determination is made as to whether HR approval has been obtained. If so, the process flow continues to activity block 212 where the requisition state is set to active, and proceeds to the access point 213 representing the end of the process flow depicted in process flow diagram 200. If HR approval is not obtained at decision point 216, the process flow continues to activity block 214 where the requisition status set to inactive.

When a determination that approval is not required is made at decision point 205, the process flow continues to activity block 217 where marketing for the requisition can be prepared by a marketing specialist or other such employee. The process flow then continues to decision point 218 where a determination is made as to whether a marketing review is to be performed. If so, the process flow continues to activity block 219 where a marketing manager review can be obtained. The process flow than continues to decision point 220 where determination is made as to whether the marketing manager has accepted the prepared marketing materials for the requisition. If so, the process flow continues to activity block 212 as before. If the marketing manager has not accepted the marketing materials, the process flow continues back to activity block 217 where a marketing specialist can revise the marketing materials as necessary.

On the other hand, if a marketing review is not required, the process flow continues to activity block 212 where the requisition state is set to active, and proceeds to the access point 213 representing the end of the process flow. This completes the process flow depicted in process flow diagram 200 according to one example embodiment.

The activities shown in the process flows of process flow diagrams 100 and 200 can be communicated to one or more relevant individuals as a task that needs to be performed. For example, the alerts can be sent to the appropriate individuals to complete the task and show up in that individual's computer display screen. When a user logs in to the client system, a list of tasks to be performed may be presented in the graphical display at the client system. The alerts can be any form of electronic communications. They can show up, for example, as emails, text messages, web links, etc. The embodiments described herein are not limited to any particular form of electronic communications for alerts—it depends on how the process definition is configured in the client system. In addition, if candidates are sourced from a third-party agency such as Volt or Manpower, these third parties can also be notified via the alert mechanism.

In addition, the embodiments described herein can also provide a visual indication (not shown) of the progress of the process flow within the process flow diagram in the client system's graphical display. Error debugging can performed using this feature. The process flow progress indication can enable users to visually see the progression of the process flow in the user's graphical display. Users can also visually see where a process flow has been stalled if such a case occurs. The indication can be configured to show the progression of the state of the process at any given time. In addition, users can select (e.g. right-click) on an activity block element in the process flow diagram to determine what action is to be performed, any parameters that may be associated with the activity block, whether there is a human action that remains to be taken, or whether there a technical error such as an API that got called and failed, etc. The system can also be configured to send out alerts to delinquent employee, relevant technical staff, etc. For example, an approval may be sitting on someone's desk for the last two weeks.

Figure 3:
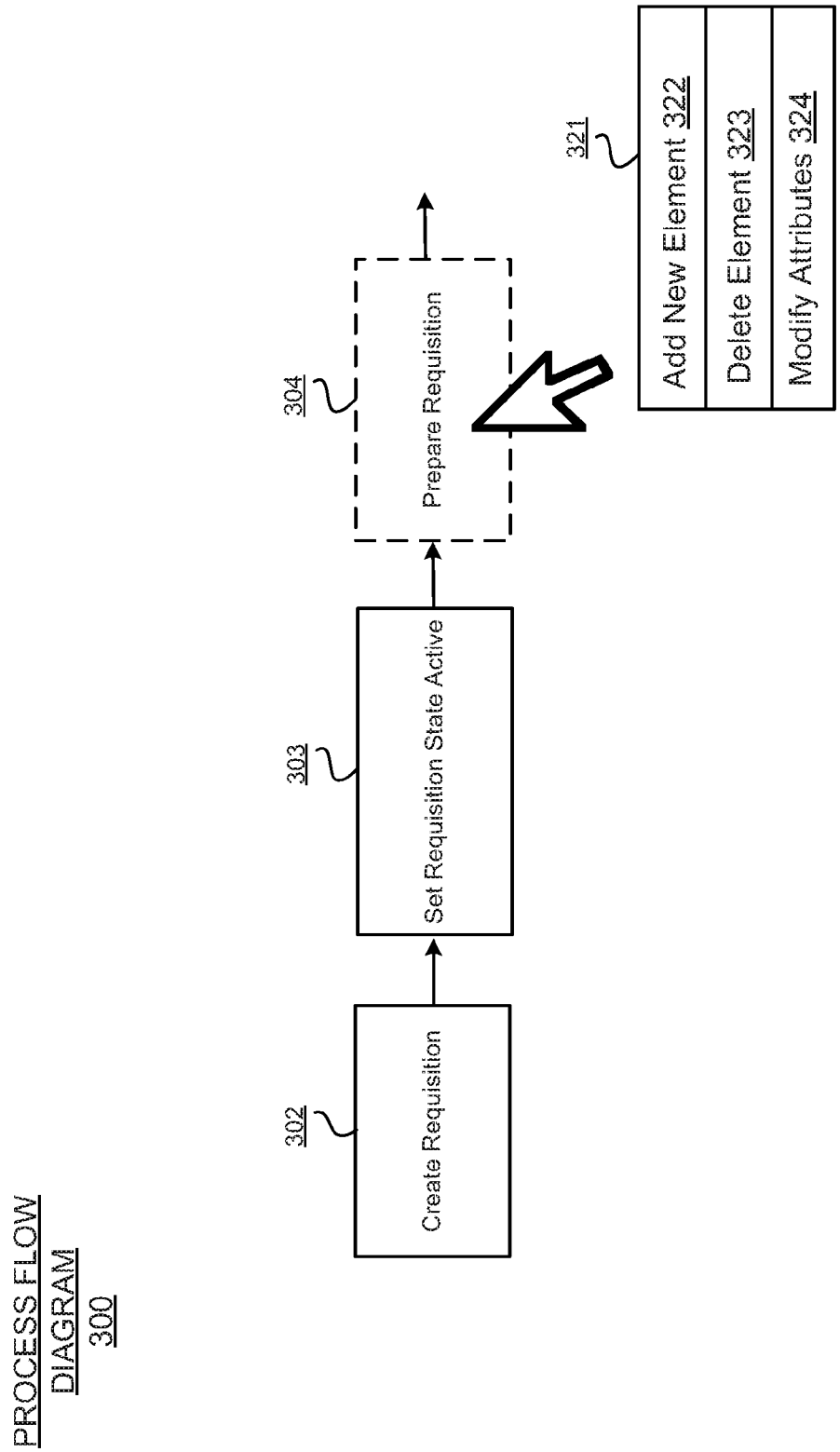
FIG. 3 depicts an example block diagram of an embodiment showing a modification to a process flow diagram according to the techniques described herein.

The initial configuration may be the definition of the process represented by the process flow in the process flow diagram. The embodiments described herein enable client users to reconfigure the initial definition in the graphical display of the process flow diagram. FIG. 3 depicts an example block diagram of an embodiment showing a modification to a process flow diagram according to the techniques described herein.

The illustrated embodiment of process flow diagram 300 depicts a series of activity blocks 302-304. As shown, a client user may select activity block 304 in a graphical display at the client's system. In response to the client user selection, a configuration options menu 321 may be displayed. The configuration options menu 321 may then allow the user to determine how the activity block is to be reconfigured including options for adding a new element 322, deleting an element 323, or modifying attributes 324. Other options can also be provided such as adding or deleting attributes.

In addition, clients can modify the sequence of activities in the process flow by dragging and dropping an element in the process flow from one location to another. In response to this, the BPE (discussed in detail below) can expose various different APIs to reconfigure the process. When the process flow reaches a particular activity block, it can perform a service call to an appropriate service module to perform the requisite operation. The system is configured to operate with a plurality of discrete service modules adapted to operate in a background process. The service modules can be accessed by the BPE. The sequence in which the service modules are accessed is based on the sequence depicted visually in the process flow diagram. The service modules themselves do not change upon a revision of the process flow; however, the sequence in which the service modules are accessed by the BPE can be changed by the order of activities according to the sequence of elements in a modified instance of the process flow diagram.

Clients can select properties from the menu 322 of possible properties that can be selected for each activity. Clients can also configure additional properties, add an additional set of API calls, add an additional set of parameters, etc. Once the client edits are finished, the client can save the process flow depicted in the process flow diagram. The changes can then be sent to the BPE and stored as a new instance of the process flow. In one embodiment, the attributes, properties, etc., in the menu are BPE extensions to the standard BPMN notation associated with the activity block.

In addition, the modified instance of the process flow can be associated with a process ID and version number to capture changes in the process over time.

I. Exemplary Systems

Provided below is a description of an example system in which the embodiments described herein may be implemented. Although certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner.

In addition, hardwired circuitry may be used independently or in combination with software instructions to implement the techniques described herein. The novel techniques described herein are not limited to any specific combination of hardware circuitry or software. For instance, the described functionality may be performed by custom hardware components containing hardwired logic for performing operations, software components, or by any combination of hardware and programmed software components. Embodiments can also be practiced in distributed computing environments where tasks are performed by remote data processing devices or systems that are linked through one or more wire-based or wireless networks.

Figure 4:
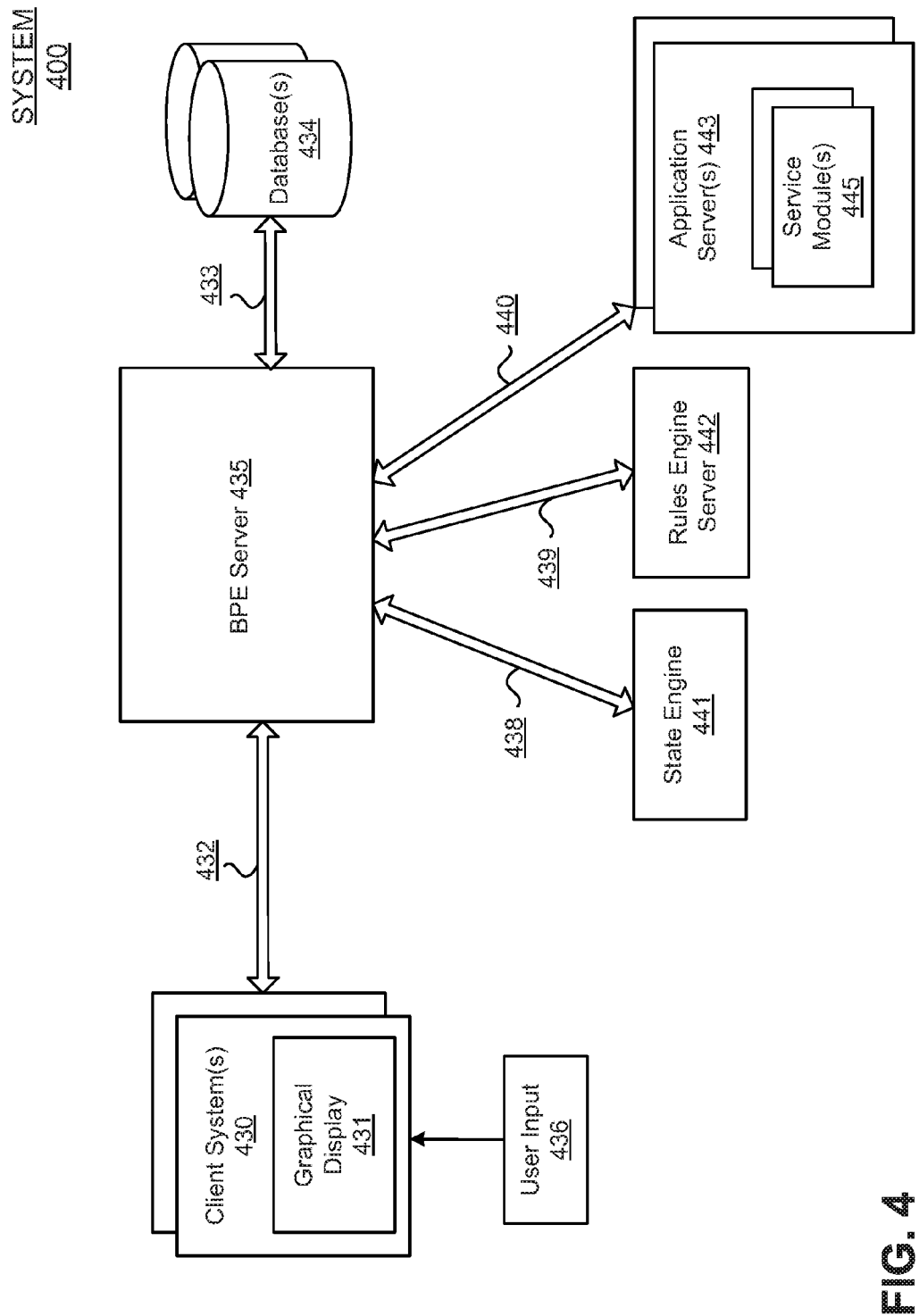
FIG. 4 depicts an example block diagram of an embodiment of a system configuration upon which the techniques described herein may be implemented.

FIGS. 4 depicts an example block diagram of an embodiment of a system configuration upon which the embodiments described herein may be implemented. In the illustrated embodiment, one or more client systems 430 comprise a graphical display 431 and are in communication with the BPE server 435 via a communication link 432. The BPE server 435 is further in communication with one or more databases 434 via a communication link 433. Further, the client system(s) 430 is configured to receive user input 436.

A state engine 441 is also in communication with the BPE server 435 via a communication link 438, a rules engine 442 is in communication with the BPE server 435 via communication link 439, and one or more application server(s) 443 comprising one or more service module(s) 445 are in communication with the BPE server 435 via communication link 440.

The BPE Server 435 may be implemented as an individual computer hardware server, or as an array of computer servers physically or logically connected together and working in coordination to perform the functionality described herein. Generally, a data server includes a system that performs data operations with respect to data stored in one or more repositories of data. Depending on the type of data server, data operations may range from simple operations, such as storing and retrieving data, to more complex operations such as computing algorithms or calculating statistics based on the data; or arranging, modifying, or formatting the data.

As will be appreciated by persons skilled in the art, the communication links 432, 433, 438, 439, and 440 may be implemented as any wired or wireless networks. In addition, communication links 432, 433, 438, 439, and 440 can be implemented as a single wired or wireless network or multiple separate networks in communication with one another. For example, the networks described herein can be implemented as a local area network ("LAN"), wide-area network ("WAN"), combination of LANs and WANs, the Internet, or any other type of communication network adapted for exchanging electronic messages and information. Further, communication links 432, 433, 438, 439, and 440 can be implemented as a physical array of hardware resources or as a virtual array, or any combination thereof. They can also be implemented in a cloud-based network configuration. For example, communication links 432, 433, 438, 439, and 440 can be implemented as public or private cloud network, or combination thereof. No specific network or network architecture should be interpreted as limiting the embodiments and techniques described herein.

In the illustrated embodiment, client system(s) 430 may be in communication with the BPE server 435 for the purpose of communicating requests to the BPE server 435. The request may include one or more definitions of one or more process flow configurations (or reconfigurations) to be stored by the BPE server 435. The request may also include request to reconfigure the one or more process flows based on modifying the process flow in a process flow diagram in the graphical display 431 at the client system 430.

The requests may be sent from the client systems 430 via communications link 432. In one embodiment, the requests may be communicated using one or more Representational State Transfer ("REST") services. REST is an architectural style that specifies constraints, such as the uniform interface, that if applied to a web service induce desirable properties, such as performance, scalability, and modifiability. This can enable web services. In the REST architectural style, data and functionality are considered resources and are accessed using Uniform Resource Identifiers (URIs), typically links on the Web. The resources are acted upon by using a set of simple, well-defined operations. The REST architectural style constrains an architecture to a client-server architecture and is designed to use a stateless communication protocol, typically HTTP. In the REST architecture style, clients and servers exchange representations of resources by using a standardized interface and protocol. In one embodiment, the Open Data Protocol (OData) is utilized. OData is an open protocol which allows the creation and consumption of queryable and interoperable RESTful APIs in a simple and standard way.

The client system 430 may be a desktop application, mobile application, etc., and may include one or more graphical displays (or user interfaces ("UIs")) 431 for clients to interact with and execute the features of the embodiments described herein. In addition, the client system 430 may perform data access operations on data stored in database system 434 by communicating data access requests/commands to the BPE server 435 via communication links 432. The BPE server 435 can be configured to receive these data access requests from clients system 430, query the database 434 via communications link 433 to retrieve the requested data. The BPE server 435 can then provide responses to the client system 430 including the requested data via the communication link 432.

The database(s) 434 can be adapted to store data for use by clients system 430. The BPE server 435 may be in remote communication with the database 434. Alternatively, the one or more database(s) 434 may be an internal component of the BPE server 435 and configured to communicate with the server 435 via any direct or indirect connection or network 314. Database(s) 434 may be implemented as any type of database system. One example embodiment includes a relational database system, in which data is stored in structured tables comprised of rows and columns. Access may be provided through data storage rules or schemas. Other examples of database systems include event-based systems where data can be stored in a semi-structured or unstructured format In accordance with the embodiments described herein, as the BPE server 435 executes a process flow according to the definition of a process flow received from the client system 430, the BPE server 435 may access one or more service module(s) 445 from one or more application server(s) 443 to provide the requisite services for the process flow. The process flow may comprise a sequence of activities, where each activity may be represented by an activity block element in the process flow diagram representing the process flow. Further, each activity element in the process flow diagram may be associated with one or more services to be provided by the service modules 445. As the BPE server 435 executes the sequence of activity element in the process flow diagram, the BPE server 435 may access the appropriate service module(s) 445 at the application server 443 to provide those services to the client system 430.

As shown, application servers 443 may be in remote communication with the BPE server 435, or may alternatively be components located within BPE server 435. The application servers 443 can include, for example, business enterprise applications adapted to facilitate the process flow depicted in the process flow diagram, such as applications for HR, purchasing, sales, marketing, etc. In at least certain aspects of this disclosure, as more and more services are defined and configured within the BPE server 435, these additional services can be made available for users. The BPE server 435 therefore can be adapted to provide a consistent way to integrate together and manage multiple discrete process flows in an organization such as a business enterprise.

As discussed above, the decision point elements in the process flow diagram include one or more conditions that may be evaluated by the rules engine 442. The rules engine 442 can be adapted to perform complex business rules. The process is first defined and then the rules can be applied to any point and are configurable by the client user. Each defined rule will know when to get executed according to the sequence of elements in the process flow. Each rule has to be executed at the appropriate decision element in the process flow diagram for the related activity to take place after that.

For example, when a condition is applied, for example, to change the country in which a process flow is executed, such as France, that condition can be evaluated in the rules engine 442. In addition, rules can be added or taken out based on the particular needs of the client. If, for example, an activity block is relocated (e.g., dragged and dropped) from one location to another in the process flow diagram in the graphical display at the client system, the BPE server 435 can be adapted to automate the process and change the rules as necessary.

The state engine 441 can be adapted to monitor and track the state of execution of the process flow depicted in the process flow diagram at the graphical display 431 of the client system 430. At each stage in the sequence of elements of the process flow diagram, the state engine 441 can be invoked to determine the state of the process flow. In one embodiment, the state engine 441 can be implemented using an open source Java library referred to in the industry as "Activiti". Activiti is an open source workflow business management engine written in Java that can execute business processes described in BPMN.

The state engine 441 can be accessed at every point in the process flow to maintain the state of the flow in underlying tables corresponding to the activity block elements depicted in the process flow diagram in the graphical display 431 of the client system 430. Any domain-specific services are provided on top of that layer such as objects, processes, services, etc. Such proprietary APIs can be exposed to the graphical display 431 at the client system 430. The state engine 441 can be configured as the engine that provides some of the common default behaviors. Then, any additional customizable behaviors can be positioned in a layer on top of the Activiti engine to capture specific domain features, services, permissions, position management, state management, entities required to perform the activities, etc. Essentially, the state engine 441 can be adapted to assist with process flow state monitoring, timers, and other generic behaviors. It can provide common ways of communicating with services, simplified integrations, OData support, etc.

In at least certain embodiments, any modifications to the process flow in the process flow diagram shown in the graphical display 431 at the client system 430 may be communicated to the BPE server 435 and stored as a new process in database 434. For example, a particular organization (e.g., Pepsi Company) may determine that they want to add a security check activity element in the process flow after a background check of a prospective employee is performed because they are a security conscious company. That additional operation can be added visually in the process flow diagram shown in the graphical display 431. The new configuration can then be saved in the database 435. The new configuration can be stored so that every time the modified process is executed, the additional operations can be triggered and evaluated. The instance of the process can be updated and stored as a new instance in the database by 34. The process essentially involves two steps (1) defining the process and (2) storing an instance of the process in the database 434. The instance of the process stored in the BPE database 434 can be thought of as the blue print or template for the process definition.

Figure 5:
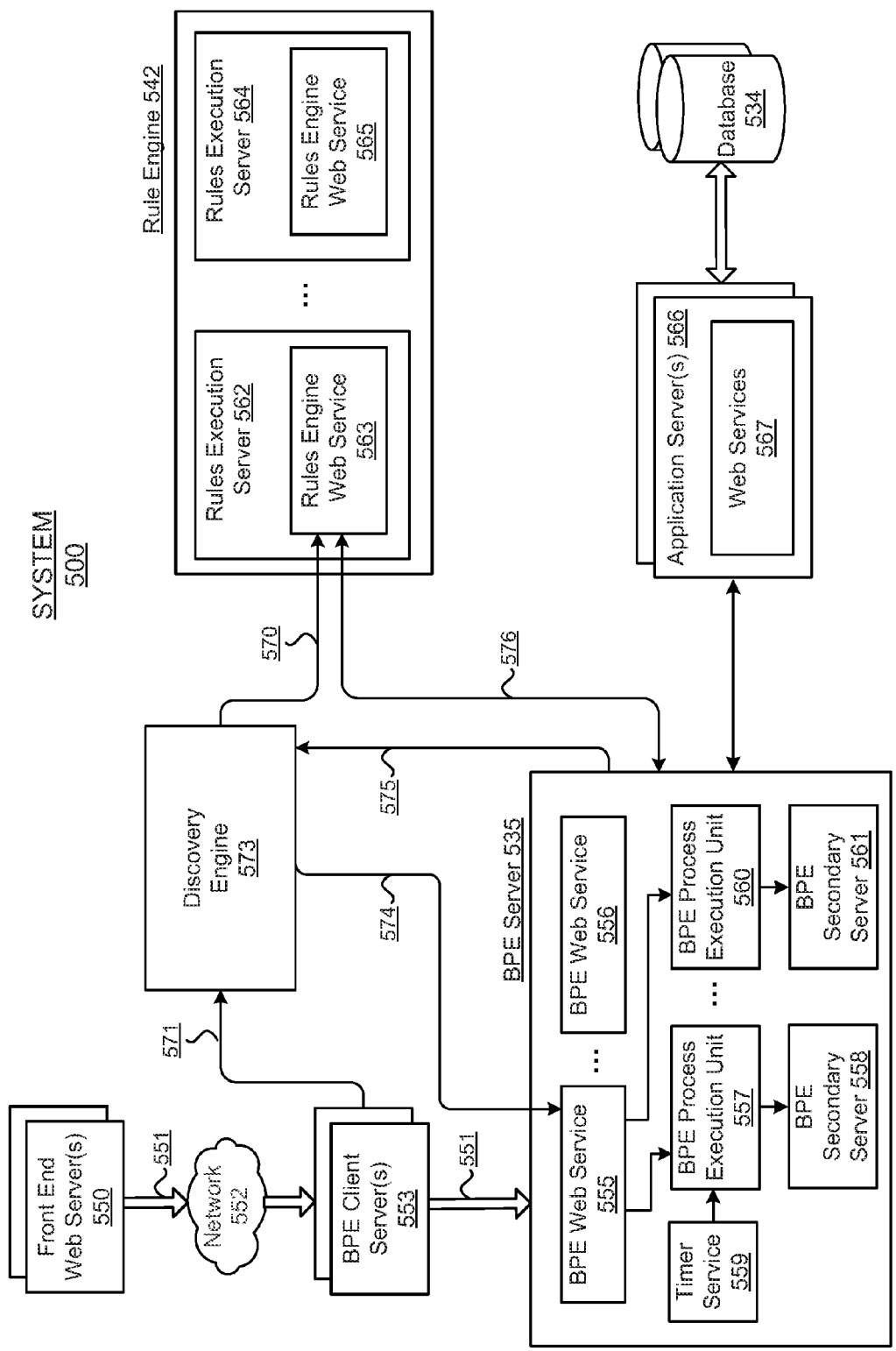
FIG. 5 depicts an example block diagram of embodiment of a system configured according to the techniques described herein.

FIG. 5 depicts an example block diagram of embodiment of a system configured according to the techniques described herein. System 500 is adapted to receive process flow configurations that have been generated at a client computer display. Users can visually define or edit a process flow visually in the client computer display by defining or editing a process flow diagram having multiple elements, including activity elements and decision elements. The process flow configurations can then be sent to the backend server adapted to process and store the process flow configurations for later use during execution of the process flow.

Once a particular process flow is executed for one or more processes within an organization, users can monitor the progress (or state) of the process flow. Visual indications (not shown) can be displayed within the process flow diagram to provide users with the current state of the execution of the process flow. Users and other individuals within or external to the organization that are necessary to accomplish tasks within the process flow may be notified at their computer systems when an activity needs to get done. Users can also determine if the process has stalled because of a technical or human error, and the system can send out notifications to delinquent individuals holding up the process, or to technical staff to resolve a problem stalling the process. These alerts and notifications can be configured at the client system.

Process flow configurations, including initial process flow definitions and reconfigurations of the process flow, can be sent from the client system in the form of request messages 551 to the BPE at the backend for processing. In the illustrated embodiment, the front end web servers 550 may be used to communicate the client requests 551. These client requests 551 may communicated to a BPE client server(s)

553 via one or more networks 552. As discussed above, the embodiments described herein are not limited to any particular wired or wireless network configuration.

The BPE client server(s) 553 can then communicate the requests 551 to the BPE server 535. The BPE server 535 includes any number of BPE Web Services 555, 556 adapted to receive communications from the BPE client server(s) 553. As discussed above, in one embodiment the web services may include REST services communicating using OData calls.

Within the BPE server 535 are a number of BPE process execution units 557, 560. The BPE process execution units 557, 560 can be utilized to execute the process flows designated in the process flow definitions and configurations received from the client and stored by the BPE server 535. A timer service 559 can be utilized to maintain a consistent state within the BPE process execution units 557, 560 during process flow execution. The BPE process execution units 557, 560 may also be in communication with BPE secondary servers 558, 561, respectively, as shown in the illustrated embodiment. The secondary servers 558, 561 can be used as backup servers and can assist with other background processing tasks.

During execution of a process flow, the BPE server 535 can make multiple calls 576 into the rules engine 542 using OData APIs whenever the process encounters a decision point. As discussed above, the process can be visually represented at the client computer display in a process flow diagram. The process flow diagram may include a number of decision elements representing the decision points in the process flow of a particular process within an organization. The rule engine 542 is adapted to execute rules relating to conditions within the decision points of the process flow. These rules and conditions may be user-configurable. Users may add additional attributes to the conditions or may delete attributes from the conditions.

The rules engine 559 may include multiple rules execution servers 562, 564 to execute the rules. Multiple rules execution servers 562, 564 may be provided to facilitate scaling and failover in cases when one of the execution servers goes offline, etc. The rules execution servers 562, 564 include rules engine web services 563, 565, respectively, to facilitate communications with the BPE server 535.

The rules engine 542 is also operable to provide results back to the BPE server 535 to facilitate calculation of decisions at decision points or calculate values for the process in the BPE process execution units 557, 560. The BPE server 535 can communicate with various applications servers (and other endpoints) 566 using web services 567 in order to facilitate providing the results of execution of the process flow back from the rules engine 542 and storing the results by querying the one or more databases 534. In one embodiment, the web services 567 comprises OData/REST Services, as discussed above.

In the illustrated embodiment, system 500 further includes a discovery engine 573. In one example embodiment, the discovery engine 573 may enable dynamic allocation of resources during runtime. The discovery engine 573 is operable to provide a way for servers that are available and online to declare themselves, as well as a way to find relevant servers for a particular task instead of resorting to fixed IP addresses. The discovery engine 573 may provide information relating to which rule servers 562, 564 are active and processing data, etc. Some processing nodes may come online or change dynamically, and the discovery engine 573 is configured to manage those resources. The discovery engine 573 can be used by different clients as the requests 551 come in to determine which servers are available to process those service requests 551, and where the available servers are located in the network topology. The resources supplied by the discovery engine 573 to process requests 551 may therefore do so transparent to the client request 551.

Discovery engine 573 may also include a cache memory (not shown) operable to cache requests, so that as new servers come online, the discovery engine 573 can push out the information to the servers. The discovery engine 573 can also update its cache when changes occur with the service. The discovery engine 573 can enable continuous deployment, hot swapping functionality, etc. for the servers within system 500. One advantage of this is that it avoids the manual process of hardcoding the network configuration and storing it in a configuration file to be later accessed during runtime. Such manual process is inherently error prone. If there are thousands of server nodes in a network, this process avoids any concerns about misconfiguring one of them.

As shown, when a request 551 is received from the client, the BPE client server(s) 553 communicate lookup requests 571 to the discovery engine 573 to identify available resources to process the request. A "look up" request is a call to the discover engine 573 in order to acquire the necessary services. During request processing, the BPE server 535 may also send a lookup request 575 to the discovery engine 573 to identify resources to process the requests. This may include accessing the necessary service modules, whether internal or external to the system 500, to provide services during execution of the process flow by the BPE process execution units 557, 560. In order to fulfill the lookup requests 571, 575 the discovery engine 573 may include a number of server references 570, 574 for the available services to be provided during execution of the process flow.

Figure 6:
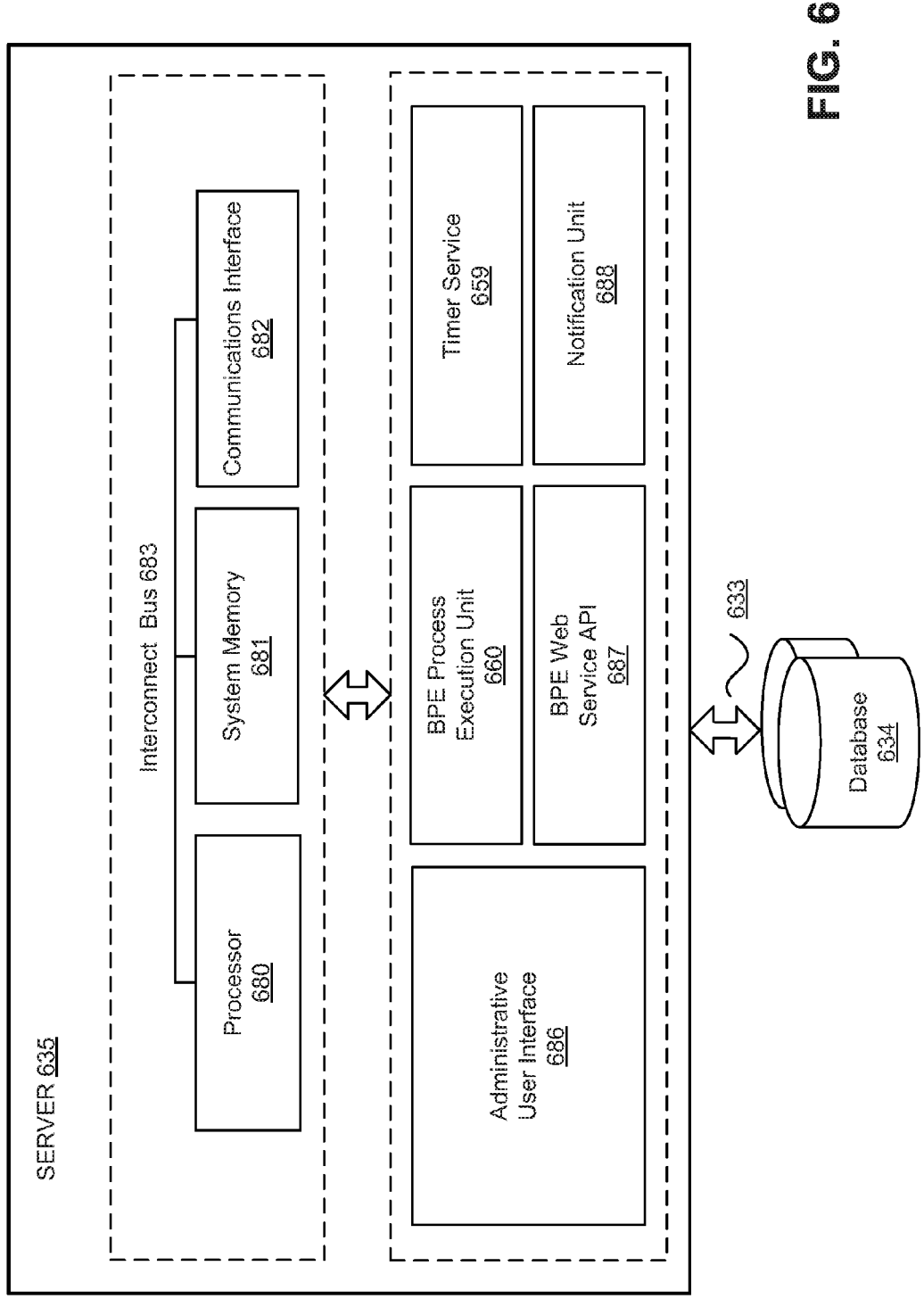
FIG. 6 depicts an example block diagram of an embodiment of a server computer configured according to the techniques described herein.

FIG. 6 depicts an example block diagram of an embodiment of a server computer configured according to the techniques described herein. As shown, server 635 is a BPE server and includes at least one processor 680, system memory 681, and communications interface 682 in communication over one or more interconnect buses 683. The server 635 is in communication with one or more databases 634 via one or more communication links 633.

In the illustrated embodiment, server 635 further comprises a BPE process execution unit 660 operable to execute process flows according to the techniques described herein. The server 635 also includes one or more BPE web services APIs to facilitate communications with the various components of the system for defining and executing process flows. Server 635 also includes a timer service 659 to synchronize the BPE process execution units during execution of process flows. A notification unit 688 is also provided to perform the notifications and alerts features discussed above.

Finally, server 635 includes an administrative user interface to provide users with a portal to manage the system and to define or reconfigure the process flows as discussed previously.

II. Exemplary Processes

Figure 7B:
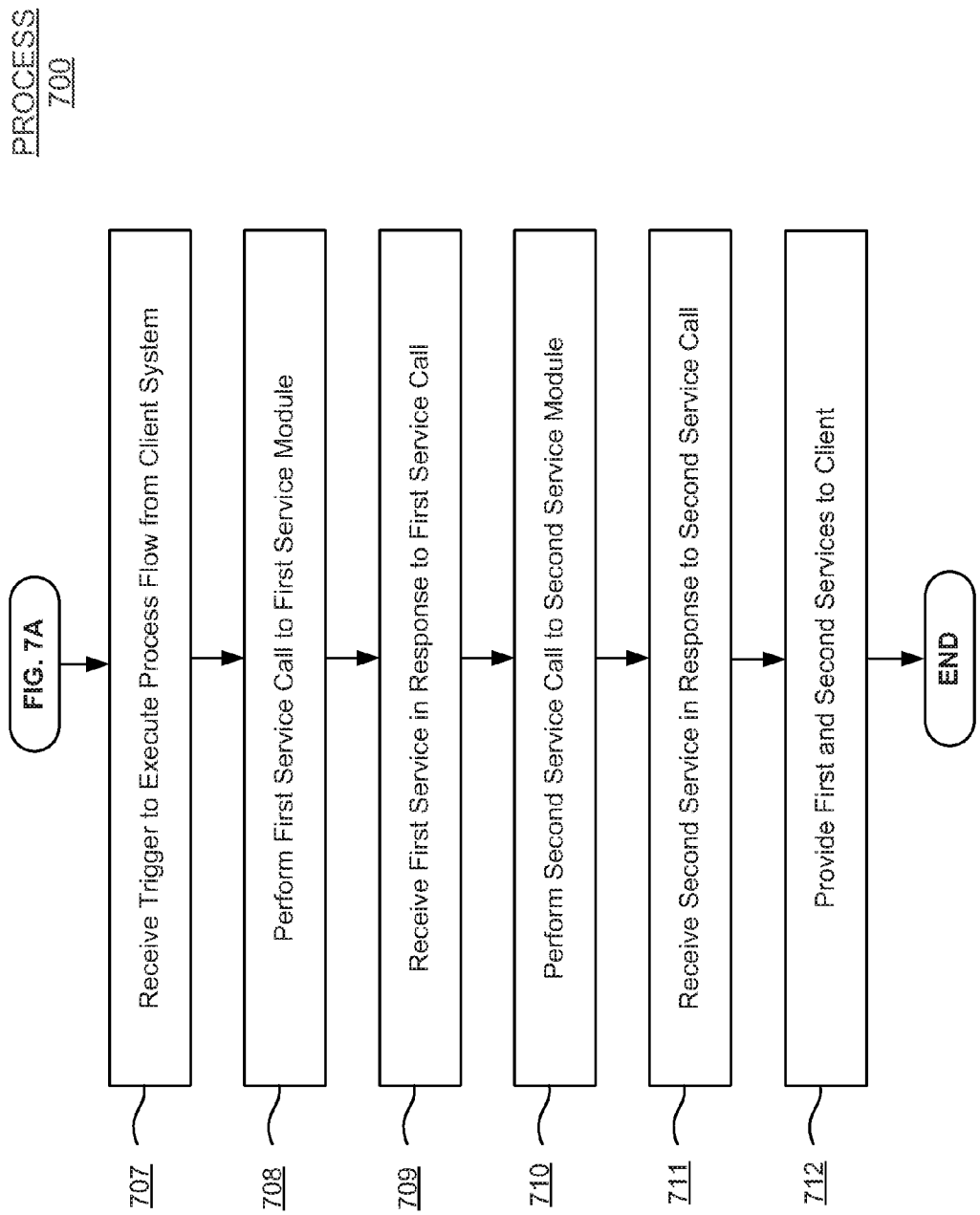

FIGS. 7A-7B depict example flow charts of an embodiment of a process for visually defining and managing multiple discrete processes according to the techniques described herein. It is noted that the processes described herein are exemplary in nature and are provided for illustrative purposes, and not intended to limit the scope of this disclosure to any particular example embodiment. For instance, methods in accordance with some embodiments may include or omit some or all of the operations described below, or may include operations in a different order than the particular order described herein. The methods described are not intended to be limited to any particular set of operations exclusive of all other potentially intermediate operations.

In addition, the operations described herein may be embodied in computer-executable code, which causes a general-purpose or special-purpose computer to perform certain functional operations. In other instances, these operations may be performed by specific hardware components or hardwired circuitry, or by any combination of hardware and programmed software components.

In the illustrated embodiment of FIG. 7A, process 700 begins at operation 701 by receiving, at a server in communication with a database, a definition of a process flow comprising a sequence of activities for one or more discrete processes. In one embodiment, each activity in the sequence of activities of the process flow can be configured to access one or more services from a plurality of different service modules in communication with the server to execute the sequence of activities of the process flow. Process 700 continues by storing the process flow in the database (operation 702) and providing, to a graphical display at a client system, a display of a process flow diagram comprising a sequence of elements visually representing the sequence of activities of the process flow (operation 703).

The server can then receive a request from the client system to reconfigure the process flow (operation 704). In one embodiment, the request to reconfigure the process flow is generated based on visually reconfiguring one or more elements in the process flow diagram at the user client computer display. Process 700 continues by reconfiguring the process flow in response to the request from the client system to generate a modified instance of the process flow (operation 705) and querying the database to store the modified instance of the process flow (operation 706).

Process 700 continues at FIG. 7B by receiving, at the server, a start event indication from the client system to execute the modified instance of the process flow (operation 707) and performing a first service call to a first service module associated with a first element in the sequence of elements in the process flow diagram (operation 708). Process 700 can then receive a first service from the first service module in response to the first service call (operation 709), perform a second service call to a second service module associated with a second element in the sequence of elements in the process flow diagram (operation 710), receive a second service from the second service module in response to the second service call (operation 711), and provide the first service and the second service to the client system (operation 712). This completes process 700 according to one example embodiment.

The sequence of elements in the process flow diagram comprises activity elements and decision elements. The elements in the process flow diagram can be reconfigured at the client system based on repositioning elements from one location to another location in the display of the process flow diagram. The elements in the process flow diagram can also be reconfigured based on adding new elements to the display of the process flow diagram or deleting elements from the display of the process flow diagram. In addition, the elements in the process flow diagram can be reconfigured at the client system based on modifying an attribute associated with an element in the process flow diagram.

As discussed above, a rules engine can evaluate one or more conditions associated with the decision elements in the process flow diagram based on one or more attributes associated with each condition. A state engine in communication with the server can be invoked during execution of the process flow to manage the state of the process flow. The current state of progression of execution of the process flow can be displayed at the client computer display at any designated point in time based on data supplied by the state engine. As discussed above, the state engine may comprise an "Activiti" engine in one embodiment.

III. Exemplary Hardware Implementation

Embodiments of the present disclosure may be practiced using various computer systems including hand-held devices, microprocessor systems, programmable electronics, laptops, tablets and the like. The embodiments can also be practiced in distributed computing environments where tasks are performed by remote processing devices that are linked through one or more wire-based or wireless networks.

Figure 8:
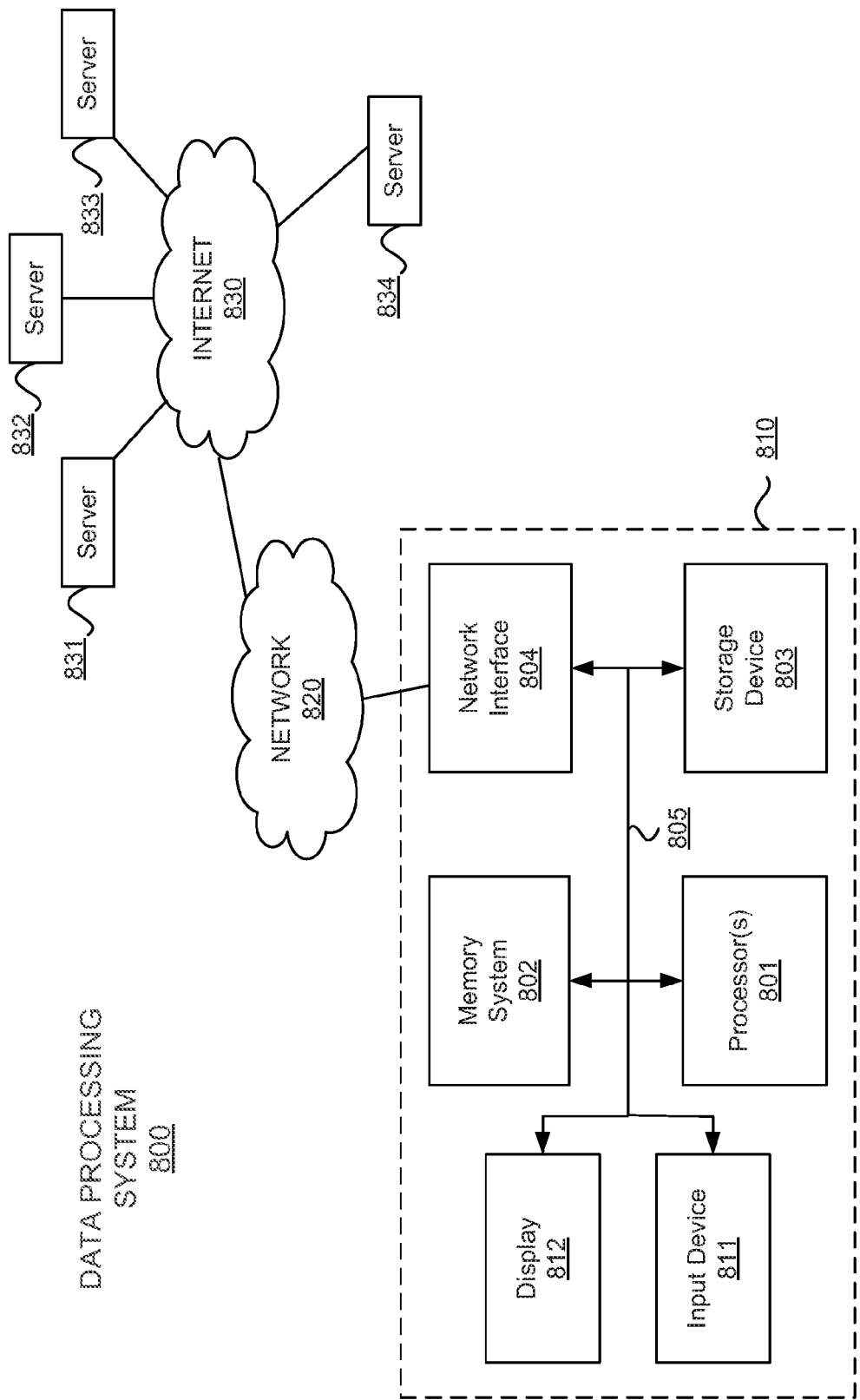
FIG. 8 depicts an example overview block diagram of a data processing system upon which the embodiments described herein may be implemented.

FIG. 8 depicts an example overview block diagram of a data processing system upon which the embodiments described herein may be implemented. The following hardware description is merely one example. It is to be understood that a variety of computers configurations may be used to implement the described techniques. While FIG. 8 illustrates various components of a data processing system 800, it is not intended to represent any particular architecture or manner of interconnecting components. It will also be appreciated that network computers and other data processing systems, which have fewer components or additional components, may be used. The data processing system 800 may, for example, comprise a personal computer (PC), workstation, laptop computer, tablet, smartphone or other hand-held wireless device, or any device having similar functionality.

In the illustrated embodiment, data processing system 800 includes a computer system 810. Computer system 810 includes an interconnect bus 805 (or other communication mechanism for communicating information) and one or more processor(s) 801 coupled with the interconnect bus 805 for processing information. Computer system 810 also includes a memory system 802 coupled with the one or more processors 801 via the interconnect bus 805. Memory system 802 is configured to store information and instructions to be executed by processor 801, including information and instructions for performing the techniques described above. This memory system may also be used for storing programs executed by processor(s) 801. Possible implementations of this memory system may be, but are not limited to, random access memory (RAM), read only memory (ROM), or combination thereof.

In the illustrated embodiment, a storage device 803 is also provided for storing information and instructions. Typically storage device 803 comprises nonvolatile memory. Common forms of storage devices include, for example, a hard drive, a magnetic disk, an optical disk, a CD-ROM, a DVD, a flash or other non-volatile memory, a USB memory card, or any other computer-readable medium from which a computer can read data and instructions. Storage device 803 may store source code, binary code, or software files for performing the techniques above. In addition, while FIG. 8 shows that storage device 803 as a local device connected with the components of the data processing system, it will be appreciated by skilled artisans that the described techniques may use a storage device remote from the system, such as a database or other network storage device coupled with the computer system 810 through a network interface such as network interface 804.

Network interface 804 may provide communications between computer system 810 and a network 820. The network interface 804 may be a wireless or wired connection, or any combination thereof. Computer system 810 is configured to send and receive information through the network interface 804 across one or more networks 820 such as a local area network (LAN), wide-area network (WAN), wireless or Bluetooth network, or the Internet 830, etc. Computer system 810 may access data and features on systems residing on one or multiple different hardware servers 831-834 across the network 820. Hardware servers 831-834 and associated server software may also reside in a cloud computing environment.

Storage device and memory system are both examples of non-transitory computer readable storage media. Embodiments herein can be embodied in computer-readable code stored on any computer-readable medium, which when executed by a computer or other data processing system, can be adapted to cause the system to perform operations according to the techniques described herein. Computer-readable media may include any mechanism that stores information in a form accessible by a data processing system such as a computer, network device, tablet, smartphone, or any device having similar functionality. Examples of computer-readable media include any type of non-transitory, tangible media capable of storing information thereon, including floppy disks, hard drive disks ("HDDs"), solid-state devices ("SSDs") or other flash memory, optical disks, digital video disks ("DVDs"), CD-ROMs, magnetic-optical disks, ROMs, RAMs, erasable programmable read only memory ("EPROMs"), electrically erasable programmable read only memory ("EEPROMs"), magnetic or optical cards, or any other type of media suitable for storing data and instructions in an electronic format. Computer-readable media can also be distributed over a network-coupled computer system stored and executed in a distributed fashion.

Further, computer system 810 may be coupled via interconnect bus 805 to a display 812 for displaying information to a computer user. An input device 811 such as a keyboard, touchscreen, and/or mouse is coupled to bus 805 for communicating information and command selections from the user to processor 801. The combination of these components allows the user to communicate with the system. In some systems, bus 805 represents multiple specialized interconnect buses.

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a computer system. The techniques may be carried out in a computer system or other data processing system in response executing sequences of instructions stored in memory.

Throughout the foregoing description, for the purposes of explanation, numerous specific details were set forth in order to provide a thorough understanding of the disclosure. It will be apparent, however, to persons skilled in the art that these embodiments may be practiced without some of these specific details. The above examples and embodiments should not be deemed to be the only embodiments, and are presented to illustrate the flexibility and advantages of the present disclosure. Other arrangements, embodiments, implementations and equivalents will be evident to those skilled in the art and may be employed without departing from the spirit and scope of the disclosure as defined by the following claims.

What is claimed is:

1. A method comprising:
receiving, at a server in communication with a database, a definition of a process flow comprising a sequence of activities for one or more discrete processes, wherein each activity in the sequence of activities of the process flow is configured to access one or more services from a plurality of different service modules in communication with the server to execute the sequence of activities of the process flow;
storing the process flow in the database;
providing, to a graphical display at a client system, a display of a process flow diagram comprising a sequence of elements visually representing the sequence of activities of the process flow;
receiving, at the server, a request from the client system to reconfigure the process flow, wherein the request to reconfigure the process flow is generated based on visually reconfiguring one or more elements in the process flow diagram at the client system;
reconfiguring the process flow in response to the request from the client system to generate a modified instance of the process flow; and
querying the database to store the modified instance of the process flow.

2. The method of claim 1 further comprising:
receiving, at the server, a start event indication from the client system to execute the modified instance of the process flow;
performing a first service call to a first service module associated with a first element in the sequence of elements in the process flow diagram;
receiving a first service from the first service module in response to the first service call;
performing a second service call to a second service module associated with a second element in the sequence of elements in the process flow diagram;
receiving a second service from the second service module in response to the second service call; and
providing the first service and the second service to the client system.

3. The method of claim 1 wherein the sequence of elements in the process flow diagram comprises activity elements and decision elements.

4. The method of claim 3 further comprising evaluating, at a rules engine, one or more conditions associated with the decision elements in the process flow diagram based on one or more attributes associated with each condition.

5. The method of claim 1 wherein the elements in the process flow diagram are reconfigured at the client system based on repositioning elements from one location to another location in the display of the process flow diagram.

6. The method of claim 1 wherein the elements in the process flow diagram are reconfigured at the client system based on adding new elements to the display of the process flow diagram or deleting elements from the display of the process flow diagram.

7. The method of claim 1 wherein the elements in the process flow diagram are reconfigured at the client system based on modifying an attribute associated with an element in the process flow diagram.

8. The method of claim 1 further comprising invoking a state engine in communication with the server during execution of the modified instance of the process flow to manage the state of the modified instance of the process flow.

9. The method of claim 1 further comprising displaying, in the graphical display at the client system, a current state of progression of the execution of the modified instance of the process flow at a point in time.

10. The method of claim 1 wherein errors during execution of the modified instance of the process flow are displayed in the process flow diagram at the client system.

11. A system comprising:
a processor;
a database system in communication with the processor via a communications medium; and
a system memory configured to store computer code, which when executed by the processor, causes the processor to perform operations comprising:
receiving a definition of a process flow comprising a sequence of activities for one or more discrete processes, wherein each activity in the sequence of activities of the process flow is configured to access one or more services from a plurality of different service modules in communication with the server to execute the sequence of activities of the process flow;
storing the process flow in the database system;
providing, to a graphical display at a client system, a display of a process flow diagram comprising a sequence of elements visually representing the sequence of activities of the process flow;
receiving a request from the client system to reconfigure the process flow, wherein the request to reconfigure the process flow is generated based on visually reconfiguring one or more elements in the process flow diagram at the client system;
reconfiguring the process flow in response to the request from the client system to generate a modified instance of the process flow; and
querying the database to store the modified instance of the process flow.

12. The system of claim 11 wherein the operations further comprise:
receiving a start event indication from the client system to execute the modified instance of the process flow;
performing a first service call to a first service module associated with a first element in the sequence of elements in the process flow diagram;
receiving a first service from the first service module in response to the first service call;
performing a second service call to a second service module associated with a second element in the sequence of elements in the process flow diagram;
receiving a second service from the second service module in response to the second service call; and
providing the first service and the second service to the client system.

13. The system of claim 12 wherein the operations further comprise evaluating, at a rules engine, one or more conditions associated with the decision elements in the process flow diagram based on one or more attributes associated with each condition.

14. The system of claim 11 wherein the sequence of elements in the process flow diagram comprises activity elements and decision elements.

15. The system of claim 11 wherein the operations further comprise invoking a state engine in communication with the server during execution of the modified instance of the process flow to manage the state of the modified instance of the process flow.

16. The system of claim 11 wherein the operations further comprise displaying, in the graphical display at the client system, a current state of progression of the execution of the modified instance of the process flow at a point in time.

17. The system of claim 11 wherein the operations further comprise communicating alerts to individuals involved in performing tasks to be completed in a sequence of activities of the modified instance of the process flow.

18. A non-transitory computer readable storage medium tangibly embodying programmed computer code, which when executed by a server, causes the server to perform operations comprising:
receiving, at a server in communication with a database, a definition of a process flow comprising a sequence of activities for one or more discrete processes, wherein each activity in the sequence of activities of the process flow is configured to access one or more services from a plurality of different service modules in communication with the server to execute the sequence of activities of the process flow;
storing the process flow in the database;
providing, to a graphical display at a client system, a display of a process flow diagram comprising a sequence of elements visually representing the sequence of activities of the process flow;
receiving, at the server, a request from the client system to reconfigure the process flow, wherein the request to reconfigure the process flow is generated based on visually reconfiguring one or more elements in the process flow diagram at the client system;
reconfiguring the process flow in response to the request from the client system to generate a modified instance of the process flow; and
querying the database to store the modified instance of the process flow.

19. The computer readable medium of claim 18 wherein the operations further comprise:
receiving, at the server, a start event indication from the client system to execute the modified instance of the process flow;
performing a first service call to a first service module associated with a first element in the sequence of elements in the process flow diagram;
receiving a first service from the first service module in response to the first service call;
performing a second service call to a second service module associated with a second element in the sequence of elements in the process flow diagram;
receiving a second service from the second service module in response to the second service call; and
providing the first service and the second service to the client system.

20. The computer readable medium of claim 18 wherein the sequence of elements in the process flow diagram comprises activity elements and decision elements.

* * * * *